US011481230B2

(12) United States Patent
Lindholm et al.

(10) Patent No.: US 11,481,230 B2
(45) Date of Patent: Oct. 25, 2022

(54) TECHNIQUES FOR MODIFYING A COMPUTE INSTANCE

(71) Applicant: Oracle International Corporation, Redwood Shores, CA (US)

(72) Inventors: Jacob M. Lindholm, Londonderry, NH (US); Andrew James Pryde, Bristol (GB); Josh Aaron Horwitz, Centreville, VA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 2 days.

(21) Appl. No.: 17/125,802

(22) Filed: Dec. 17, 2020

(65) Prior Publication Data
US 2022/0197670 A1 Jun. 23, 2022

(51) Int. Cl.
  *G06F 9/44* (2018.01)
  *G06F 9/445* (2018.01)
  *G06F 16/22* (2019.01)

(52) U.S. Cl.
  CPC ...... *G06F 9/44505* (2013.01); *G06F 16/2255* (2019.01)

(58) Field of Classification Search
None
See application file for complete search history.

(56) References Cited

U.S. PATENT DOCUMENTS

| | | | |
|---|---|---|---|
| 2003/0120760 A1* | 6/2003 | Fortin | H04L 41/0873 709/221 |
| 2004/0153452 A1* | 8/2004 | Carro | G06F 21/6218 707/999.009 |
| 2008/0070282 A1* | 6/2008 | Zialko | |

OTHER PUBLICATIONS

Paladi et al., SDN Access Control forthe Masses, Computers& Security, vol. 80, XP085525846, ISSN: 0167-4048, DOI: 10.1016/J.COSE.2018.10.003, Oct. 11, 2018, 31 pages.
International Application No. PCT/US2021/021575, International Search Report and Written Opinion dated Jul. 21, 2021, 13 pages.

* cited by examiner

*Primary Examiner* — Keshab R Pandey
(74) *Attorney, Agent, or Firm* — Kilpatrick Townsend & Stockton LLP

(57) ABSTRACT

Systems, devices, and methods discussed herein are directed to modifying aspects of a compute instance. A user may request a change to the compute instance. The system may derive a state object indicating a future state of the compute instance were the change to be applied. A hash of a subset of the state object's attributes may be computed and provided to the requesting computing component. The system may subsequently proceed with applying the change. A current state object indicating a current state of the compute instance may be derived based on applying the change. An additional hash of the subset of the current state object's attributes may be computed and provided to the requesting computing component. The two hashes may be configured to enable the requesting computing component to verify the change to the compute instance has been implemented.

17 Claims, 12 Drawing Sheets

TECHNIQUES FOR MODIFYING A COMPUTE INSTANCE

BACKGROUND

Cloud computing providers may manage many compute instances on behalf of a variety of users. Typically, a user may not modify aspects of those computing instances. Additionally, it can be difficult to ascertain when a change to a compute instance has converged. Embodiments described herein address these and other problems, individually and collectively.

BRIEF SUMMARY

Techniques are provided (e.g., a method, a system, non-transitory computer-readable medium storing code or instructions executable by one or more processors) for modifying aspects of a compute instance that is managed by a cloud computing infrastructure (CII) provider. Various embodiments are described herein, including methods, systems, non-transitory computer-readable storage media storing programs, code, or instructions executable by one or more processors, and the like.

One embodiment is directed to a method. The method may comprise managing, by a computing system, a compute instance of a cloud computing environment based at least in part on management of a first state object corresponding to the compute instance. In some embodiments, the first state object comprises a set of attributes indicating a current state of the compute instance. The method may further comprise receiving, by the computing system from a requesting computing component, change request data indicating a requested change to a particular attribute of the compute instance. The method may further comprise deriving, by the computing system, a second state object of the compute instance based at least in part on the requested change and the first state object indicating the current state of the compute instance. The method may further comprise calculating, by the computing system, a first hash value based at least in part on a first subset of attributes of a set of attributes of the second state object. The method may further comprise providing, by the computing system to the requesting computing component, the first hash value. The method may further comprise executing, by the computing system, the requested change to the compute instance. The method may further comprise updating, by the computing system, the first state object based at least in part on executing the requested change to the compute instance. The method may further comprise calculating, by the computing system, a second hash value based at least in part on a second subset of the set of attributes of the first state object. The method may further comprise providing, by the computing system, the second hash value to the requesting computing component. In some embodiments, the first hash value and the second hash value are configured to be utilized by the requesting computing component to verify that the requested change has been implemented at the compute instance.

Another embodiment is directed to a computing device. The computing device may comprise a computer-readable medium storing non-transitory computer-executable program instructions. The computing device may further comprise a processing device communicatively coupled to the computer-readable medium for executing the non-transitory computer-executable program instructions. Executing the non-transitory computer-executable program instructions with the processing device causes the computing device to perform the method above.

Yet another embodiment is directed to a non-transitory computer-readable storage medium storing computer-executable program instructions that, when executed by a processing device of a computing device, cause the computing device to perform the method above.

The foregoing, together with other features and embodiments will become more apparent upon referring to the following specification, claims, and accompanying drawings.

BRIEF DESCRIPTION OF THE DRAWINGS

Various embodiments in accordance with the present disclosure will be described with reference to the drawings, in which.

DETAILED DESCRIPTION

Figure 1:
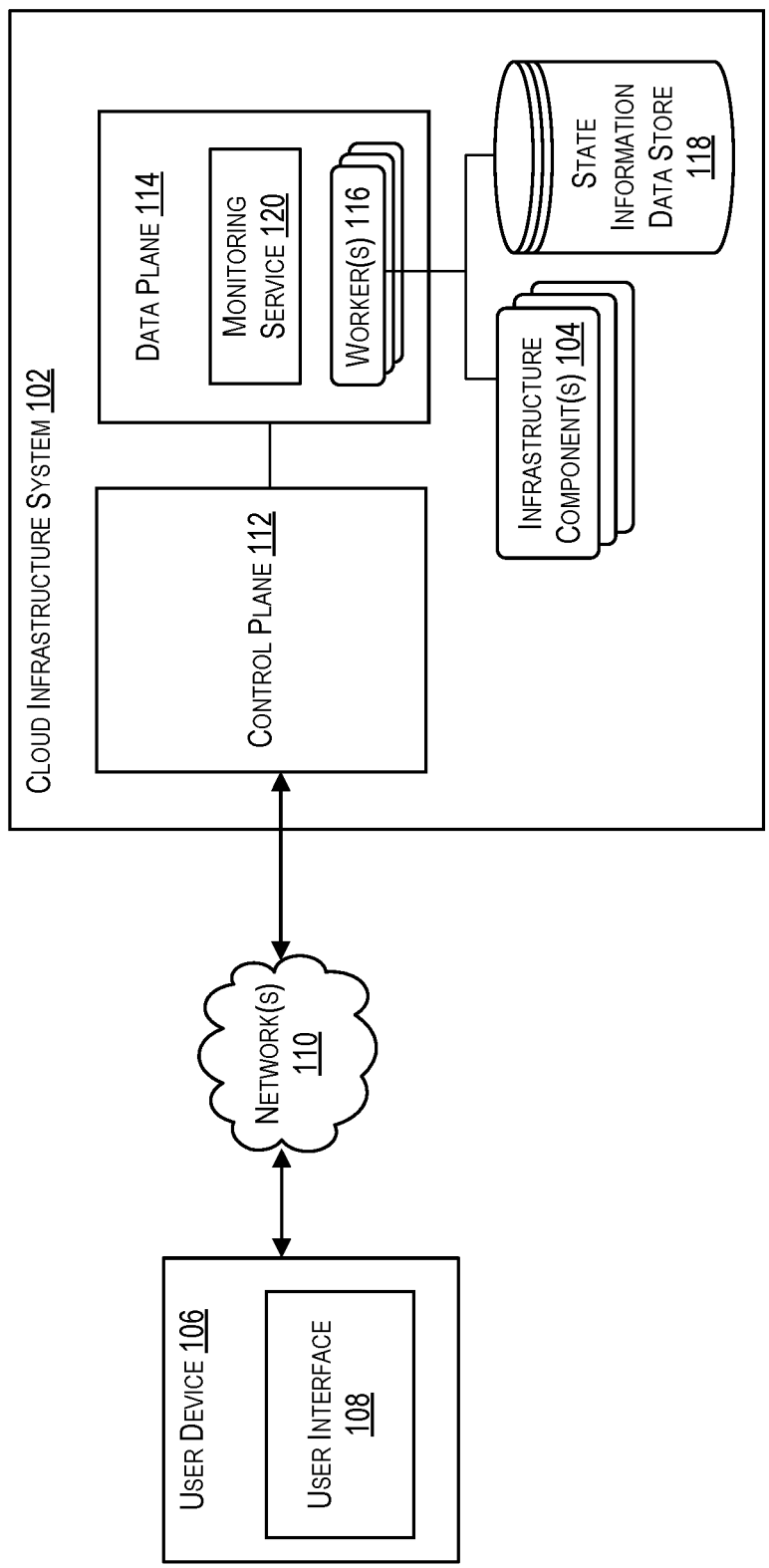
FIG. 1 illustrates an example environment in which the disclosed techniques for modifying a compute instance may be implemented, according to at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure relates to a system and techniques for enabling user modification of a compute instance managed by one or more cloud-computing provider computers (referred to herein as "cloud computing computer(s)" for brevity). A user may wish to change some aspect of a compute instance. By way of example, the user may wish to request a name change for a component of a compute instance. Accordingly, the user may submit, via an application programming interface exposed by the cloud computing computer(s), a request to modify an attribute of the compute instance (e.g., an attribute corresponding to the name of a component of the compute instance). The cloud computing computer(s) may receive the request and retrieve a current state of the compute instance. The current state of the compute instance may be maintained in a state object (referred to as a "current state object"). The cloud computing computer(s) may compute a future state of the compute instance should the change be implemented. By way of example, the state object may be copied and its attributes may be modified in accordance with the request change. These modified set of attributes may be stored as a separate state object (referred to as a "requested state object") for subsequent use.

Each compute instance may be associated with any suitable number of attributes. These attributes may include an image version running on the instance (e.g., an image version corresponding to an operating system, a software package, a default configuration, or the like), a number of central processing units (CPUs), an amount of memory allocated to the host, an expiration time of one or more security tokens, an address indicating which compute instance to use, and the like. Although examples herein discuss a user's modification of a component name, it should be appreciated that the examples equally apply to other changes the user may request. These changes requested by the user may relate to one or more modifications of any suitable combination of attributes associated with the compute instance.

A hash value may be calculated from a subset of the set of attributes of the requested state object. The particular set of attributes hashed may be predefined and vary depending on the requestor (or the computing component utilized to initiate the change request). It may be the case that different users may be interested in different aspects of the compute instance. Thus, a hash value computed for one user may utilize a different set of attributes/data fields of the object then a set of attributes/data fields of the object used for computing a hash for another user.

The hash value (e.g., a hash value corresponding to the requested change) may be provided to a component that provided the change request (e.g., a requesting computing component) and stored for subsequent verification. Periodically, the current state object of the compute instance may be retrieved and a hash value corresponding to the current state of the compute instances may be computed from that object and provided to the requesting computing component. The hash values may be utilized by the requesting computing component to determine that the requested change has been applied to the compute instance. By way of example, the requesting computing component may compare the hash value corresponding to the requested change and the hash value corresponding to the current state of the compute instance. If the hash values match, the requesting computing component may be configured to determine that the requested change has been applied to the compute instance.

The disclosed techniques provide improvements over conventional systems. Conventional systems may restrict user's from modifying aspects of a compute instance and/or it may be difficult to ascertain when a particular change has been made to a compute instance. By utilizing the techniques described herein, the requesting computing component need not compare attributes of the requested state object to those of the state object that maintains the current state of the compute instance. Rather, the requesting computing component need only compare two hash values to ascertain whether the requested change has been implemented. A management plane of the cloud-computing provider computer(s) can be utilized to enact the requested change, update the current state of the compute instance, and calculate the hash values. In this manner, although the particular attributes associated with a requesting computing component and/or the exact implementation may change in the management plane, the requesting computing component (e.g., a control plane of the cloud-computing provider computer(s)) need not be modified. By maintaining the logic corresponding to modifying compute instances and calculating hash values in the management plane, the implementation of the requesting computing component (e.g., the control plane of the computing system) is greatly simplified and decoupled from changes made to the management plane.

Moving on to FIG. 1, which illustrates an example environment 100 in which the disclosed techniques for modifying a compute instance may be implemented, according to at least one embodiment. Environment 100 may include cloud infrastructure system 102 that is configured to manage, on behalf of a user, one or more infrastructure components (e.g., infrastructure component(s) 104). A cloud-computing provider can host the cloud-computing environment 102 which provides infrastructure component(s) 104 (e.g., servers, storage devices, network nodes (e.g., hardware), deployment software, platform virtualization (e.g., a hypervisor layer), or the like). The one or more infrastructure components may include any suitable number of compute instances that are configured to provide a particular infrastructure component. A compute instance may include one or more bare metal compute instances that provides dedicate physical server access for high performance and strong isolation and/or one or more virtual machines. A virtual machine is an independent computing environment that runs on top of physical bare metal hardware. The infrastructure component(s) 104 may be configured to provide computing resources to any suitable number of users. In some embodiments, the cloud-computing provider may also supply a variety of services to accompany those infrastructure components (e.g., billing, monitoring, logging, security, load balancing and clustering, etc.). Thus, as these services may be policy-driven, users may be able to implement policies to drive load balancing to maintain application availability and performance.

In some instances, user device 106 may be utilized to access (e.g., via user interface 108) resources and services of the cloud infrastructure system 102. The user device 106 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, or the like. In some examples, the user device 106 may be in communication with the cloud infrastructure system 102 via the network(s) 110, or via other network connections. In some examples, the network(s) 110 may include any one or a combination of many different types of networks, such as cable networks, the Internet, wireless networks, cellular networks, and other private and/ or public networks. The user device 106 can be utilized to invoke functionality of the cloud infrastructure system 102 to create virtual machines (VMs) (e.g., compute instances), install operating systems (OSs) in the VMs, deploy middleware, such as databases, create storage buckets for workloads and backups, and/or install enterprise software onto that VM. User device 106 may further be utilized to request provider's services to perform various functions, including balancing network traffic, troubleshooting application issues, monitoring performance, managing disaster recovery, etc.

The cloud infrastructure system 102 may include a control plane 112 and a data plane 114. In some embodiments, the control plane 112 may expose one or more application programming interfaces with which the functionality of the cloud infrastructure system 102 may be invoked (e.g., by the user device 106). The control plane 112 may be configured to receive requests (e.g., from user device 106) and, in response to those requests, provide data to the data plane 114 for performing operations corresponding to those requests. In some embodiments, the control plane 112 may be configured to provide status updates to user device 106 regarding status of one or more requests initiated by user device 106. Some of the requests received by the control plane 112 may request modification to existing infrastructure component(s) 104.

The cloud infrastructure system 102 may include data plane 114. In some embodiments, the data plane 114 may be configured to perform any suitable operations for provisioning, deploying, and maintaining the infrastructure component(s) 104 according to the requests provided by the control plane 112. In some embodiments, data plane 114 may utilize one or more computing processes (e.g., worker(s) 116) to perform various operations related to provisioning infrastructure component(s) 104, deploying software artifacts to the infrastructure component(s) 104, modifying aspects of the infrastructure component(s) 104, or the like.

The data plane 114 may be configured to maintain state objects corresponding to a current state of each of the infrastructure component(s) 104. These state object may be periodically updated by the monitoring service 120 on change, according to a predefined periodicity, according to a schedule, or at any suitable time. In some embodiment, the data plane 114 may maintain additional state objects each corresponding to requested change submitted for a given infrastructure component. These additional state object may be referred to herein as "desired state objects". Examples of current state objects and desired state objects are provided in connection with FIGS. 3 and 4, respectively. In some embodiments, these objects may be stored in state information data store 118.

The data plane 114 may, at any suitable time, calculate a hash of one or more attributes of a state object. The particular attributes used to calculate a hash may, in some embodiments, depend on the requestor and/or the requesting computing component that requested a change in the infrastructure component. In some embodiments, the data plane 114 may be configured with a mapping that identify a corresponding set of attributes from a state object that are to be utilized to calculate a hash value for a particular requestor/requesting computing component. The data plane 114 may compute hash values corresponding to a desired state and a current state of the infrastructure component. By way of example, the data plane 114 may maintain attributes corresponding to a current state of an infrastructure in a current state object stored in state information data store 118. The data plane 114 may retrieve the current state object and modify its attributes according to a requested change received from the control plane 112 (and, in some embodiments, initiated from the user device 106). The data plane 114 may calculate a hash value corresponding to the desired state and provide this hash value to the control plane 112, which in turn may store the hash value for subsequent use. The control plane 112 may be configured to request the current state hash value from the data plane 114 according to a predefined periodicity and/or schedule.

The data plane 114 may be configured to instantiate and/or task worker(s) 116 with executing operations for applying a requested change to a given infrastructure component. In some embodiments, the data plane 114 may store data corresponding to various tasks associated with managing and/or modifying the infrastructure component(s) 104 in state information data store 118 (or another suitable location). The worker(s) 116 may be configured to retrieve this data sequentially (e.g., in the order in which the data was stored) and execute any suitable operations for performing the task (e.g., modifying an attribute of an infrastructure component). The monitoring service 120 may monitor the state of an infrastructure component and, upon determining a change has occurred, may update a current state object corresponding to the current state of that infrastructure component. This updated object may continue to be stored in the state information data store 118. The monitoring service 120 may invoke functionality of the data plane 114, and/or the monitoring service 120 may be configured, to calculate a hash value corresponding to the current state object as modified by the requested change. The hash values calculated by the data plane 114 and/or components of the data plane 114 (e.g., the monitoring service 120) may be provided to the control plane 112 at any suitable time (e.g., immediately, or upon the next request received from the control plane 112 for a current state hash value). The control plane 112 may be configured to perform reconciliation operations such as comparing the desired state hash value provided earlier to each current state hash value obtained from the data plane 114. When the control plane 112 determines that the desired state hash value and the current state hash value match, it may be configured to provide status data to the user device 106 via the user interface 108 that indicates the requested change has been completed. In some embodiments, once a requested change is completed, the data plane 114 (or a component of the data plane 114 such as worker(s) 116 may perform operations to delete any data pertaining to the requested change, while the current state object persists in the state information data store 118 continuing to be updated by the monitoring service 120 over time.

Figure 2:
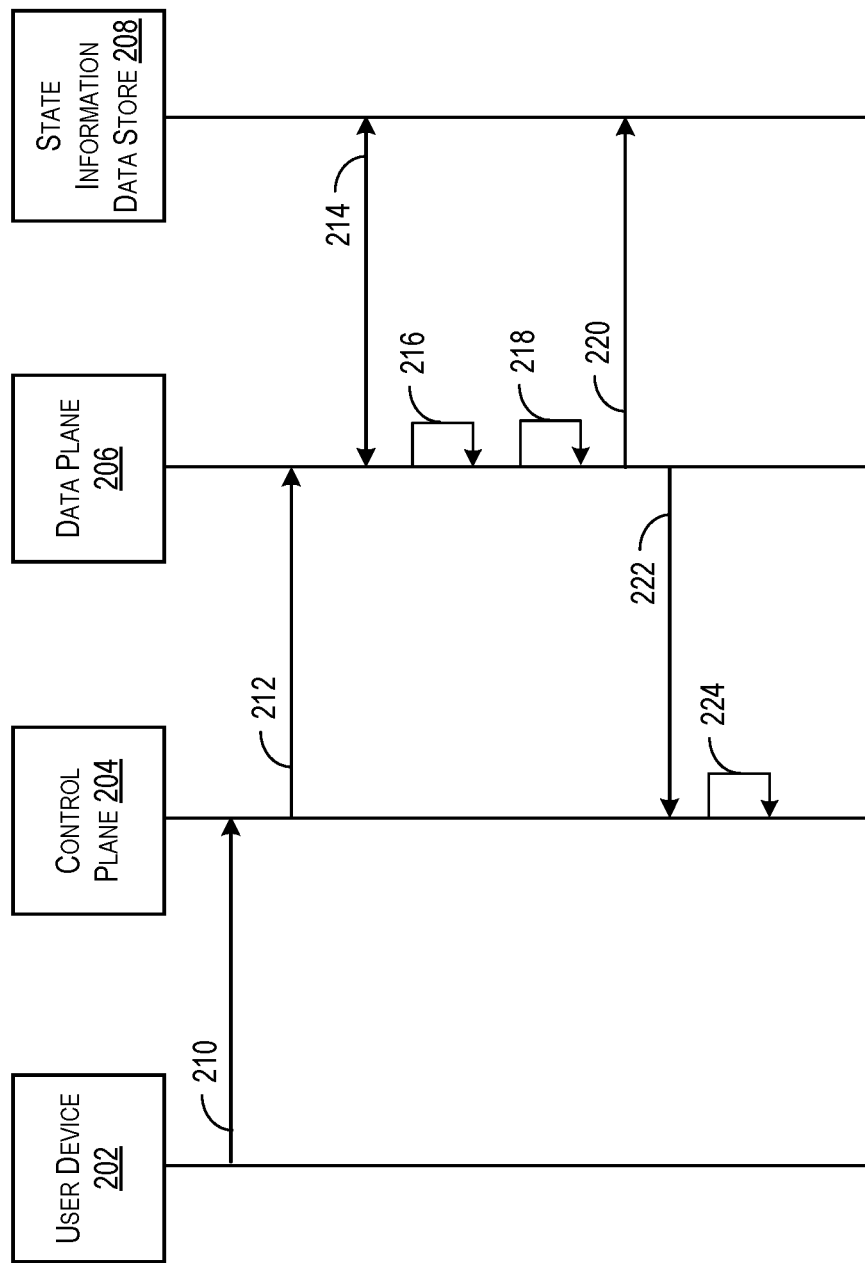
FIG. 2 is a flow diagram illustrating an example method for deriving a hash value representing a requested change to a compute instance, according to at least one embodiment.

FIG. 2 is a flow diagram illustrating an example method 200 for deriving a hash value representing a requested change to a compute instance, according to at least one embodiment. The method 200 may be performed by user device 202 (e.g., the user device 106 of FIG. 1), control plane 204 (e.g., the control plane 112 of FIG. 1), data plane 206 (e.g., the data plane 114 of FIG. 1), and state information data store 208 (e.g., the state information data store 118 of FIG. 1). The method 200 may include more or fewer operations that those illustrated in FIG. 2. These operations may be performed in any suitable order. In some embodiments, one or more operations performed by a multiple components may be performed by a single component and/or operations performed by a single component may be split and provided by multiple components.

The method 200 may begin at 210, where the user device 202 may initiate (e.g., via a user interface such as the user interface 108 of FIG. 1) a request to modify an aspect of an existing infrastructure component. By way of example, the user device 202 may be utilized to initiate a request (e.g., a change request) to modify a component name (or another attribute such as image version, number of CPUs, amount of memory, an expiration time corresponding to one or more security tokens, an address, etc.) of a particular infrastructure component. The change request may include any suitable data such as an identifier of the user device 202 and/or an entity (e.g., a user) associated with the user device 202, any suitable data for indicating the requested change(s), and any suitable data that indicates the infrastructure component(s) (e.g., one or more of the infrastructure component(s) 104 of FIG. 1) to which the change request applies.

At 212, the control plane 204 may utilize any suitable application programming interface exposed by the data plane 206 to pass the change request to the data plane 206. At 214, in response to receiving the change request, the data plane 206 may be configured to obtain a state object from the state information data store 208 corresponding to the infrastructure component(s) identified in the change request. For illustrative purposes, an example change request may indicate a change (e.g., a name change, image version change, a change to the number of CPUs, a change to the amount of memory, a change to an expiration time, an address change, or the like) for a single infrastructure component. In this example, the state object that is used by the data plane 206 to maintain current state attributes associated with that infrastructure component may be obtained from the state information data store 208. In some embodiments, an identifier for the infrastructure component may be obtained from the change request and utilized to retrieve a corresponding state object from the state information data store 208.

Figure 3:
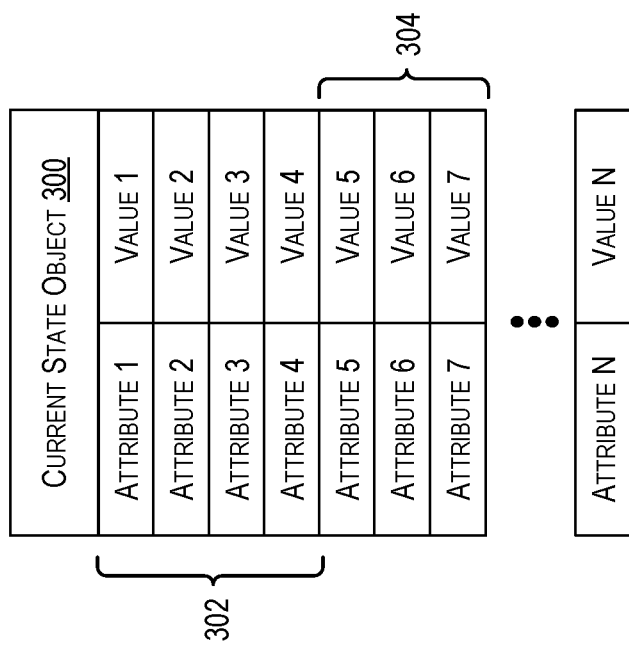
FIG. 3 illustrates an example current state object, according to at least one embodiment.

FIG. 3 illustrates an example current state object (e.g., current state object 300, a state object that maintains a set of attributes corresponding to the current state of the infrastructure component being modified in connection with FIG. 2), according to at least one embodiment. The current state object may include any suitable number of attributes. Each attribute may include an attribute identifier (e.g., "attribute 1," "attribute 2," etc.) and a corresponding value (e.g., value 1, value 2, etc.). The current state object 300 may be utilized to store a superset of the attributes associated with the current state of a particular infrastructure component. In some embodiments, at least one of the attributes of the set may include an identifier corresponding to the infrastructure component to which the object pertains. This identifier may be utilized to search for and retrieve the object from a set of objects, each one corresponding to different infrastructure components.

In some embodiments, it may be the case that a particular requestor is not interested in every attribute of the current state. Rather, one change requestor may be interested in a subset of attributes (e.g., attribute subset 302) while a different change requestor may be interested in a different subset of attributes (e.g., attribute subset 304). In some embodiments, these subsets may be mutually exclusive or two or more subsets may share one or more attributes among them. The data plane 206 of FIG. 2 may be configured with a mapping that indicates the particular subset of attribute that pertains to a particular requestor. In some embodiments, this mapping may be preloaded prior to run time as part of configuration efforts associated with the data plane.

Returning to FIG. 2, the data plane 206 may identify, from the mapping, a subset of attributes associated with the change request. As a non-limiting example, the mapping may identify subset 302 as pertaining to the change requestor. The data plane 206 may generate a new state object (e.g., a desired state object) and copy the attributes of current state object 300 to this new state object. The desired state object may then be modified in accordance with the change request. Said another way, the data plane 206 may modify one or more attributes of the desired state object to values that should exist in the current state object after the change to the infrastructure component is complete. These attributes and corresponding values, including any changes made with respect to the change request, may be referred to as "desired state data" and may be used to indicate a desired and/or future state of the infrastructure component.

Figure 4:
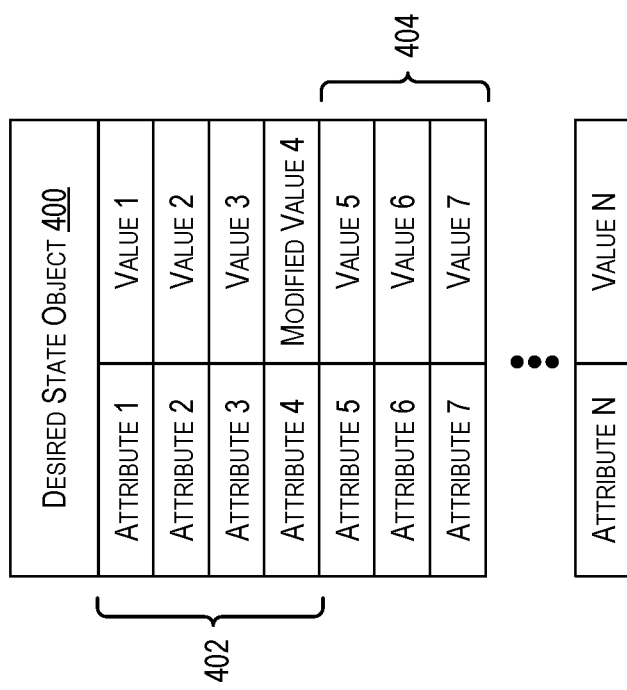
FIG. 4 illustrates an example desired state object, according to at least one embodiment.

FIG. 4 illustrates an example desired state object (e.g., desired state object 400), according to at least one embodiment. The desired state object 400 may be substantially similar to the current state object 300 of FIG. 3 in that it may include the same attributes as the current state object 300, although the respective values of those attributes may differ between the objects. The desired state object 400 may also include a superset of attributes that indicate a state of an infrastructure component. While the current state object maintains data (e.g., current state data) that indicates a current state of the infrastructure component, the desired state object 400 may be utilized to maintain data indicating a desired and/or future state corresponding to a change request. The desired state object 400 may also include attribute subset 402 and attribute subset 404 which corresponding with attribute subset 302 and attribute subset 304, respectively.

Returning to FIG. 2, the method 200 may proceed to 218, where the data plane 206 may identify from the mapping it stores, an attribute subset (e.g., attribute subset 402 of FIG. 2) that corresponds to the requesting computing component (e.g., an entity associated with the user device 106. By way of example, the data plane 206 may obtain the identifier of the user device 202 and/or an entity (e.g., a user) associated with the user device 202 from the change request data received at 212 and utilize this identifier to identify attribute subset 402. Using the attributes of the attribute subset 402, the data plane 206 may compute a hash value using a predefined hashing algorithm and attribute subset 402 as input. The particular operations performed to calculate hash values using any suitable number of attributes may be identified according to a predefined scheme known to and enforced by the data plane 206. In some embodiments, the change request data may be stored at the state information data store 208 at 220. For example, in some embodiments, the change request data and the computed hash value may be stored in the desired state object which in turn is stored in the state information data store 208. In some embodiments, the state information data store 208 may serve as a queue for pending changes to be made. Thus, the change request data may be stored in any suitable manner that indicates operations for the change have yet to be made.

At 222, the data plane 206 may provide the hash value calculated from the desired state data to the control plane 204 which in turn may store the hash value in local memory at 224. This hash value may be referred to herein as the "desired state hash value."

Figure 5:
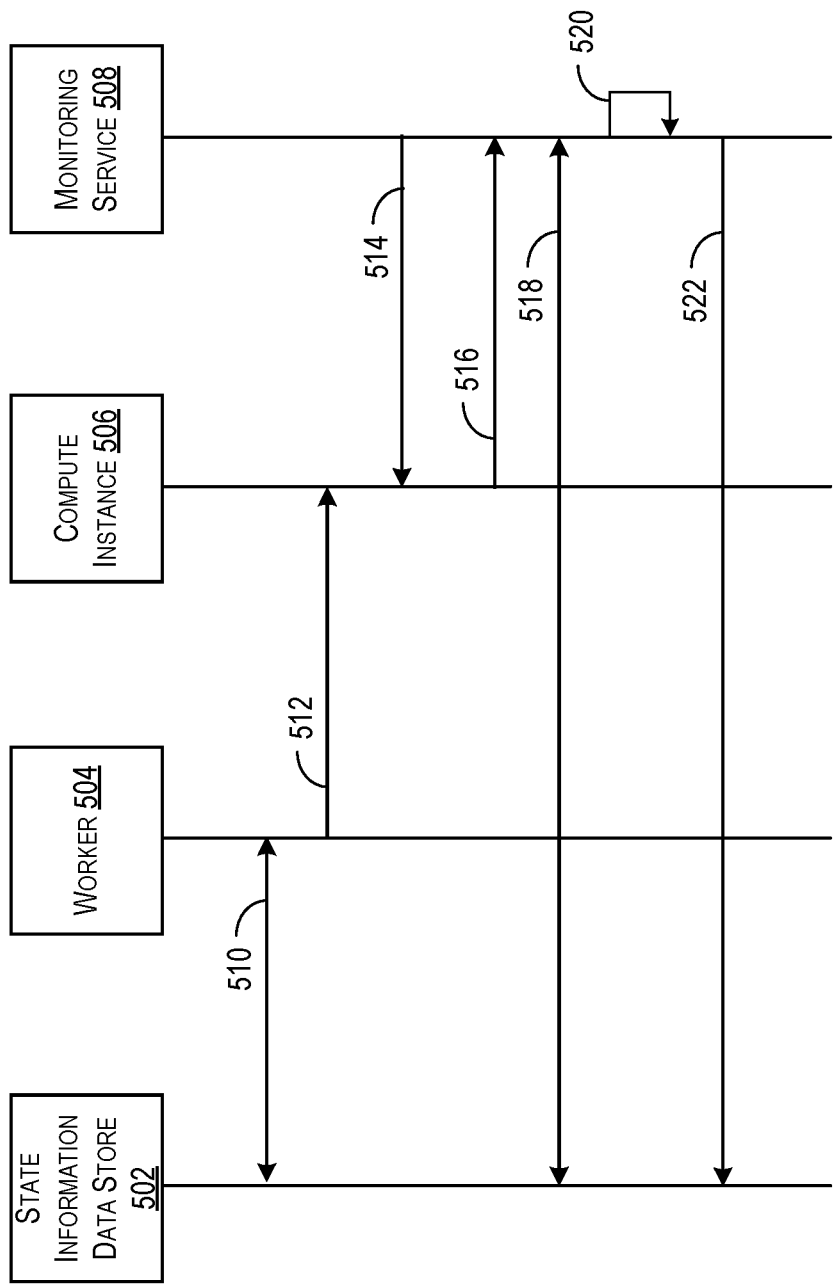
FIG. 5 is a flow diagram illustrating an example method for applying a requested change to a compute instance, according to at least one embodiment.

FIG. 5 is a flow diagram illustrating an example method 500 for applying a requested change to a compute instance (e.g., a particular infrastructure component of the infrastructure component(s) 104 of FIG. 1), according to at least one embodiment. The method 500 may be performed with the state information data store 502 (e.g., the state information data store 118 of FIG. 1), worker 504 (e.g., one of the worker(s) 116 of FIG. 1), compute instance 506 (e.g., the particular infrastructure component to which the change request of FIG. 2 pertains, one of the infrastructure component(s) 104 of FIG. 1), and monitoring service 508 (e.g., the monitoring service 120 of FIG. 1). The method 500 may include more or fewer operations than those shown in FIG. 5. The operations of method 500 may be performed in any suitable order. In some embodiments, one or more operations performed by a multiple components may be performed by a single component and/or operations performed by a single component may be split and provided by multiple components.

The method 500 may begin at 510, where a worker 504 may be instantiated and request, from the state information data store 502, change request data corresponding to the next change to be made to an infrastructure component. In some embodiments, the state information data store 502 may maintain a queue of one or more change requests that have yet to be applied. In some embodiments, the worker 504 may be configured to obtain the oldest change request from the state information data store 502.

The worker may be configured to access logic for identifying particular operations to be performed to apply the requested change as indicated by the change request data. At 512, the worker 504 may perform these operations to apply the change to compute instance 506 (the particular infrastructure component to which the change request relates).

At 514, the monitoring service 508 may be configured to request state data corresponding to the compute instance 506. In some embodiments, the monitoring service 508 may be configured to request state data from compute instance 506 according to a predefined periodicity, schedule, or the like.

At 516, the monitoring service 508 may receive current state data indicating a current state of the compute instance 506. Additionally, or alternatively, the compute instance 506 may report its current state data as a result of the operations performed by the worker at 512. Additionally, or alternatively, the worker 504 may report the change to the monitoring service 508 (for example, upon completion of the change requested).

At 518, the monitoring service 508 may request access to the current state object corresponding to the compute instance 506. By way of example, the monitoring service 508 may submit a request to the state information data store 502 for a current state object corresponding to an identifier associated with the compute instance 506 and, in response to this request, the state information data store 502 may return the current state object.

At 520, the monitoring service 508 may perform any suitable operations for updating the current state object with the current state data received at 516. In some embodiments, these operations may include overwriting one or more previous attribute values stored in the current state object with different values obtained from the current state data received at 516.

At 522, the monitoring service 508 may perform operations to store newly-modified current state object in the state information data store 502. By storing the newly-modified current state object in the state information data store 502, the monitoring service 508 may make the current state data accessible to the data plane 114 of FIG. 1 and/or any suitable component of the data plane 114.

Figure 6:
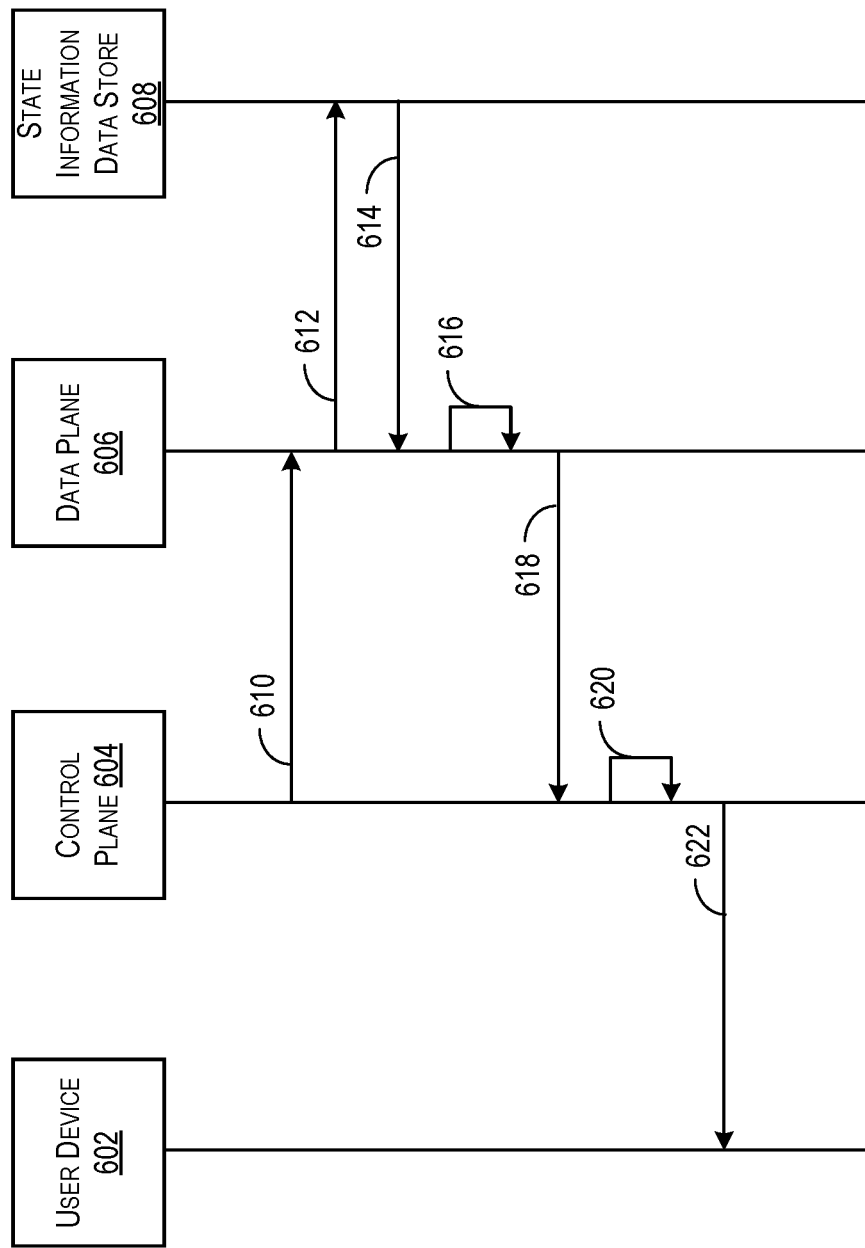
FIG. 6 is a flow diagram illustrating an example method for identifying that a previously-requested change has been made to a compute instance, according to at least one embodiment.

FIG. 6 is a flow diagram illustrating an example method 600 for identifying that a previously-requested change has been made to a compute instance, according to at least one embodiment. The method 500 may be performed with the user device 602 (e.g., the user device 202 of FIG. 2), the control plane 604 (e.g., the control plane 204 of FIG. 2), the data plane 606 (e.g., the data plane 206 of FIG. 2), and the state information data store 608 (e.g., the state information data store 502 of FIG. 5). The method 600 may include more or fewer operations than those shown in FIG. 6. The operations of method 600 may be performed in any suitable order. In some embodiments, one or more operations performed by a multiple components may be performed by a single component and/or operations performed by a single component may be split and provided by multiple components. In some embodiments, the method 600 may be performed after the method 200 of FIG. 2 has been performed.

The method 600 may begin at 610, wherein the control plane 604 may submit a request for current state data to the data plane 606. In some embodiments, the control plane 604 may submit this request according to a predefined periodicity, according to a predefined schedule, or at any suitable time. As a non-limiting example, once the method 200 has been performed, the control plane 604 may be configured to request current state data for the corresponding infrastructure component associated with the change request of FIG. 2 at a periodic rate (e.g., every five minutes, two minute, 30 seconds, daily, nightly, etc.). In some embodiments, this request may indicate the requestor (e.g., the user device 106 of FIG. 1 and/or an entity associated with that device) of the change request of FIG. 2 and an identifier for the infrastructure component to which the change request pertained.

At 612, the data plane 606 may access the current state object corresponding to the identifier for the infrastructure component to which the change request pertained. At 614, the state information data store 608 may return the current state object for that infrastructure component.

At 616, using the identifier for the requestor provided by the control plane 604 at 610, the data plane 606 may consult its locally stored mapping to identify an attribute subset (e.g., the attribute subset 302 of FIG. 3) to which the requestor is associated. Using only the attributes of that subset and a predefined hashing algorithm, the data plane 606 may be configured to compute another hash value representing a current state of the infrastructure component with respect to that subset of attributes. The particular operations performed to calculate this hash value may be identified according to a predefined scheme known and enforced by the data plane 206.

At 618, the hash value calculated at 616 (referred to as the current state hash value) may be provided to the control plane 604 in response to the request submitted at 610.

At 620, the control plane 604 may be configured to compare the desired state hash value received at 222 as part of performing the method 200 of FIG. 2. In some embodiments, if the current state hash value provided at 618 does not match the desired state hash value received at 222 during the method 200, the method 600 may proceed back to 610 when, at a subsequent time, a new request for current state data is submitted resulting in a new current state hash value being computed and compared to the desired state hash value. This method may be repeated any suitable number of times until the comparison indicates the current state hash value and the desired state hash value match. A match, in this context, indicates that the requested change to the corresponding infrastructure component has been completed.

At 622, the control plane 604 may provide an indication to the user device 602 that the requested change was completed. In some embodiments, this indication may be presented at the user interface 108 of FIG. 1. Although not depicted, it should be appreciated that the user interface 108 may provide one or more options for cancelling a previously submitted change request. This option may be exercised by a user at any suitable time (e.g., after a relatively substantial time period has passed after a change request was submitted, for example, 30 minutes for a change that should have taken approximately two minutes to complete).

Figure 7:
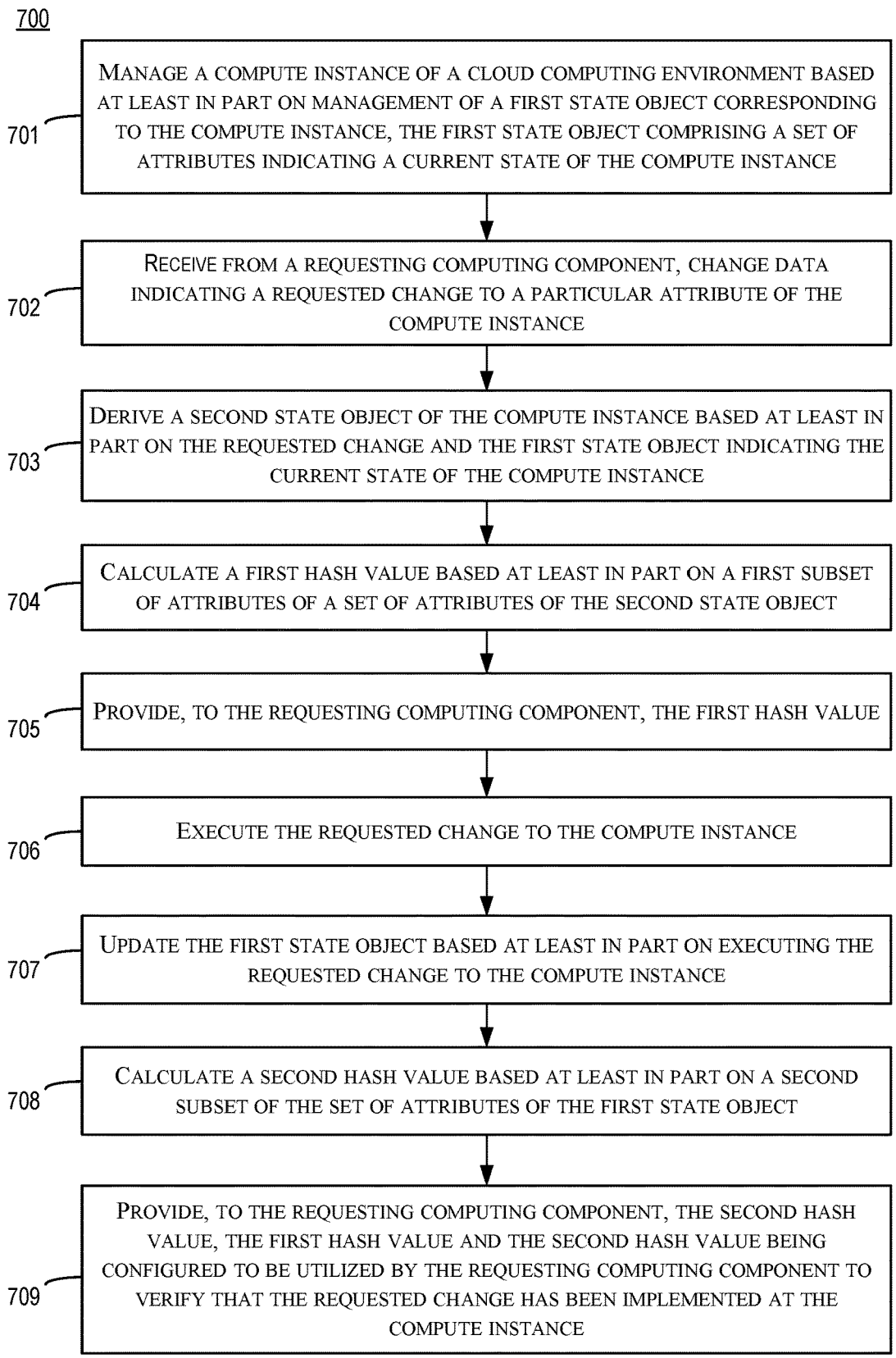
FIG. 7 depicts a flowchart illustrating an example of a method for modifying an attribute of a compute instance, according to at least one embodiment.

FIG. 7 depicts a flowchart illustrating an example of a method 700 for modifying an attribute of a compute instance, according to at least one embodiment. The method 700 may be performed by one or more components of the cloud infrastructure system 102 of FIG. 1. The method 700 may include more or fewer operations than those depicted in FIG. 7. These operations may be performed in any suitable order.

The method 700 may being at 701, where a compute instance (e.g., an infrastructure component of the infrastructure component(s) 104 of FIG. 1) of a cloud computing environment (e.g., environment 100 of FIG. 1) may be managed by a computing system (e.g., by the cloud infrastructure system 102). In some embodiments, the compute instance may be managed based at least in part on management of a first state object corresponding to the compute instance (e.g., the current state object 300 of FIG. 3). In some embodiments, the first state object comprises a set of attributes indicating a current state of the compute instance (e.g., attributes 1-N of FIG. 3).

At 702, change request data indicating a requested change to a particular attribute of the compute instance may be received by the computing system (e.g., by the control plane 204, by the data plane 206, etc.) from a requesting computing component (e.g., the user device 202 of FIG. 2, an example of the user device 106 of FIG. 1, the control plane 204, etc.).

At 703, a second state object of the compute instance (e.g., the desired state object 400 of FIG. 4) may be derived (e.g., by the data plane 206 of FIG. 2) based at least in part on the requested change and the first state object indicating the current state of the compute instance. An example of this derivation is discussed at 216 of FIG. 2.

At 704, a first hash value (e.g., a desired state hash value) is calculated by the computing system (e.g., the data plane 206). In some embodiments, the first hash value is calculated based at least in part on a first subset of attributes (e.g., attribute subset 402 of FIG. 4) of a set of attributes of the second state object. An example of this calculation is discussed above at 218 of FIG. 2.

At 705, the first hash value (e.g., the desired state hash value) is provided by the computing system (e.g., the data plane 206) to the requesting computing component (e.g., the control plane 204, the user device 202 via the control plane 204).

At 706, the computing system executes the requested change to the compute instance. Executing the requested change can comprise initiating a separate computing process (e.g., worker 504 of FIG. 5, an example of the worker(s) 116 of FIG. 1) to perform one or more operations for applying the change request to the compute instance.

At 707, the first state object (e.g., the current state object associated with the compute instance) may be updated by the computing system (e.g., the monitoring service 508 of FIG. 5) based at least in part on executing the requested change to the compute instance. An example of this update is discussed above at 520 of FIG. 5.

At 708, a second hash value is calculated (e.g., by the data plane 606 of FIG. 6, an example of the data plane 114 of FIG. 1). In some embodiments, the second hash value (e.g., a current state hash value) is calculated based at least in part on a second subset of the set of attributes of the first state object (e.g., attribute subset 302 of FIG. 3 which correspond to the attribute subset 402 of FIG. 4).

At 709, the second hash value (e.g., the current state hash value) is provided by the computing system to the requesting computing component (e.g., the control plane 604, the user device 602 via the control plane 604). In some embodiments, the first hash value and the second hash value are configured to be utilized by the requesting computing component to verify that the requested change has been implemented at the compute instance. By way of example, the control plane 604 may be configured to compare the first hash value (e.g., the desired state hash value received at 222 of FIG. 2) with the second hash value (e.g., the current state hash value received at 618 of FIG. 6). The requesting computing component may identify the change requested as being completed when the two hash values match. If the hash values do not match, the requesting computing component (e.g., the control plane 604) may subsequently request new current state data (e.g., a new current state hash value representing attributes of a later state) and perform the comparison again. This process may be repeated any suitable number of times until a match is identified and/or the change request is cancelled (e.g., via the user interface 108 of FIG. 1).

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
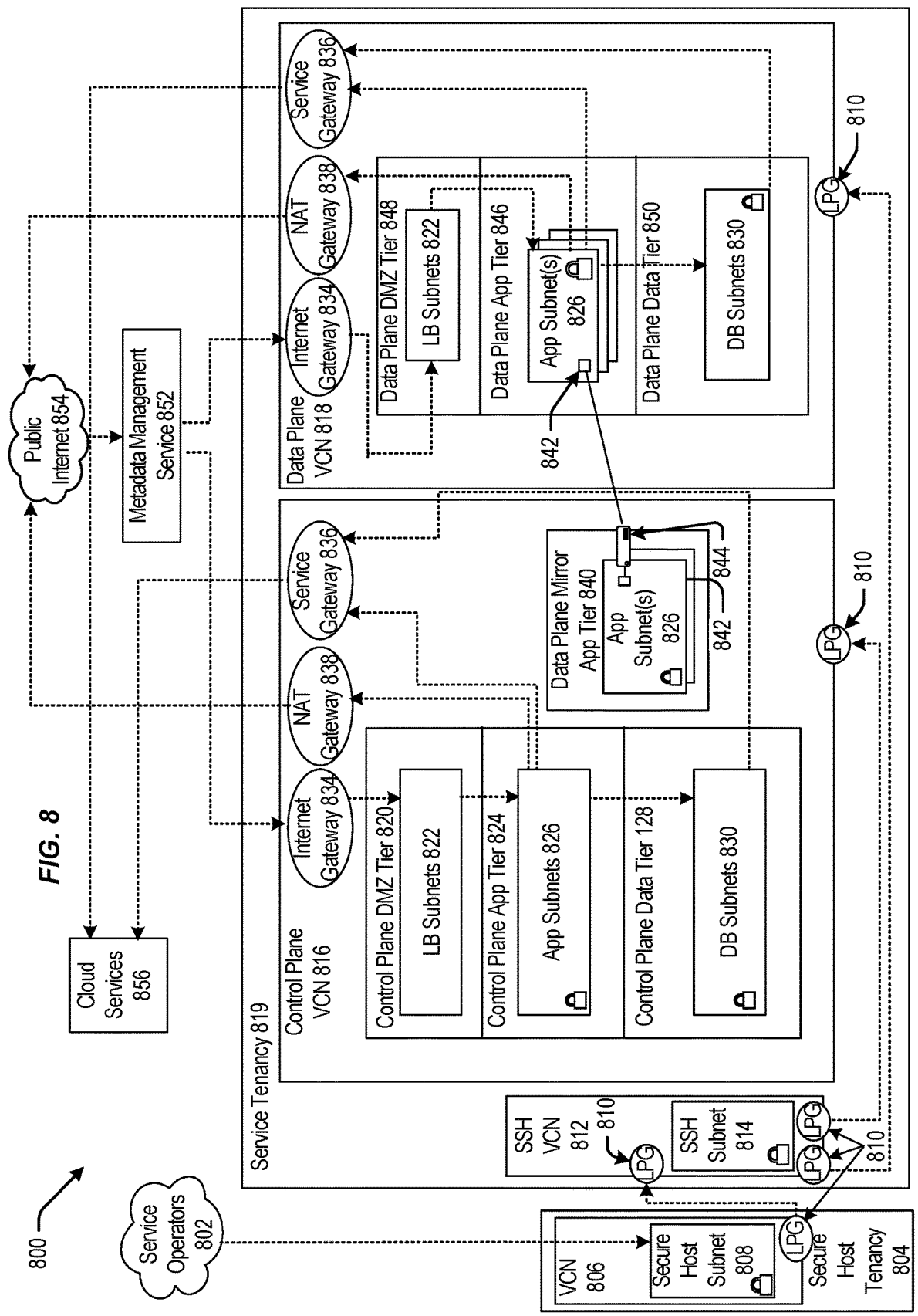
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep security breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Memory that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of security, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
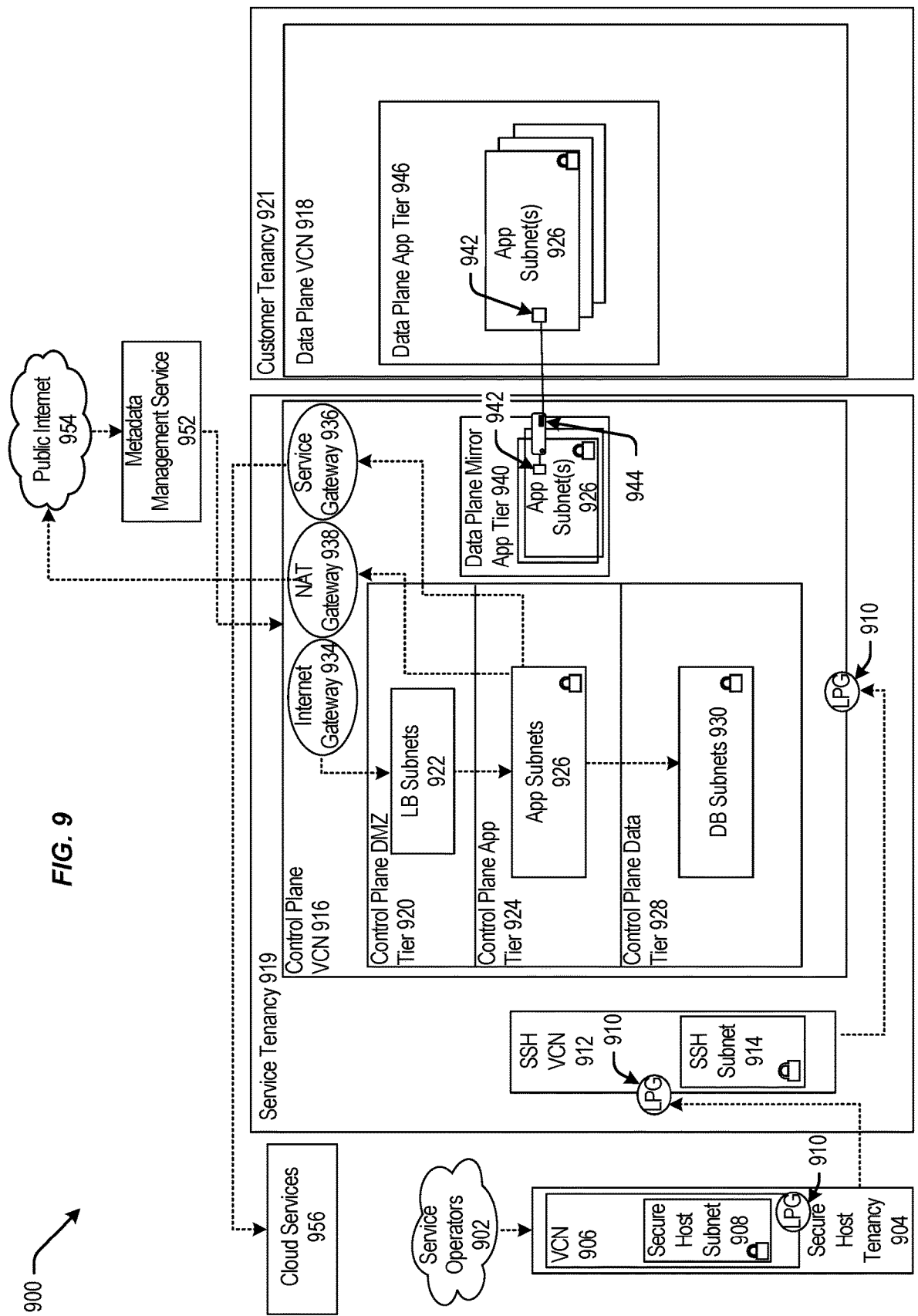
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 802 of FIG. 8) can be communicatively coupled to a secure host tenancy 904 (e.g. the secure host tenancy 804 of FIG. 8) that can include a virtual cloud network (VCN) 906 (e.g. the VCN 806 of FIG. 8) and a secure host subnet 908 (e.g. the secure host subnet 808 of FIG. 8). The VCN 906 can include a local peering gateway (LPG) 910 (e.g. the LPG 810 of FIG. 8) that can be communicatively coupled to a secure shell (SSH) VCN 912 (e.g. the SSH VCN 812 of FIG. 8) via an LPG 810 contained in the SSH VCN 912. The SSH VCN 912 can include an SSH subnet 914 (e.g. the SSH subnet 814 of FIG. 8), and the SSH VCN 912 can be communicatively coupled to a control plane VCN 916 (e.g. the control plane VCN 816 of FIG. 8) via an LPG 910 contained in the control plane VCN 916. The control plane VCN 916 can be contained in a service tenancy 919 (e.g. the service tenancy 819 of FIG. 8), and the data plane VCN 918 (e.g. the data plane VCN 818 of FIG. 8) can be contained in a customer tenancy 921 that may be owned or operated by users, or customers, of the system.

The control plane VCN 916 can include a control plane DMZ tier 920 (e.g. the control plane DMZ tier 820 of FIG. 8) that can include LB subnet(s) 922 (e.g. LB subnet(s) 822 of FIG. 8), a control plane app tier 924 (e.g. the control plane app tier 824 of FIG. 8) that can include app subnet(s) 926 (e.g. app subnet(s) 826 of FIG. 8), a control plane data tier 928 (e.g. the control plane data tier 828 of FIG. 8) that can include database (DB) subnet(s) 930 (e.g. similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g. the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g. the service gateway of FIG. 8) and a network address translation (NAT) gateway 938 (e.g. the NAT gateway 838 of FIG. 8). The control plane VCN 916 can include the service gateway 936 and the NAT gateway 938.

The control plane VCN 916 can include a data plane mirror app tier 940 (e.g. the data plane mirror app tier 840 of FIG. 8) that can include app subnet(s) 926. The app subnet(s) 926 contained in the data plane mirror app tier 940 can include a virtual network interface controller (VNIC) 942 (e.g. the VNIC of 842) that can execute a compute instance 944 (e.g. similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g. the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g. the metadata management service 852 of FIG. 8) that can be communicatively coupled to public Internet 954 (e.g. public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g. cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
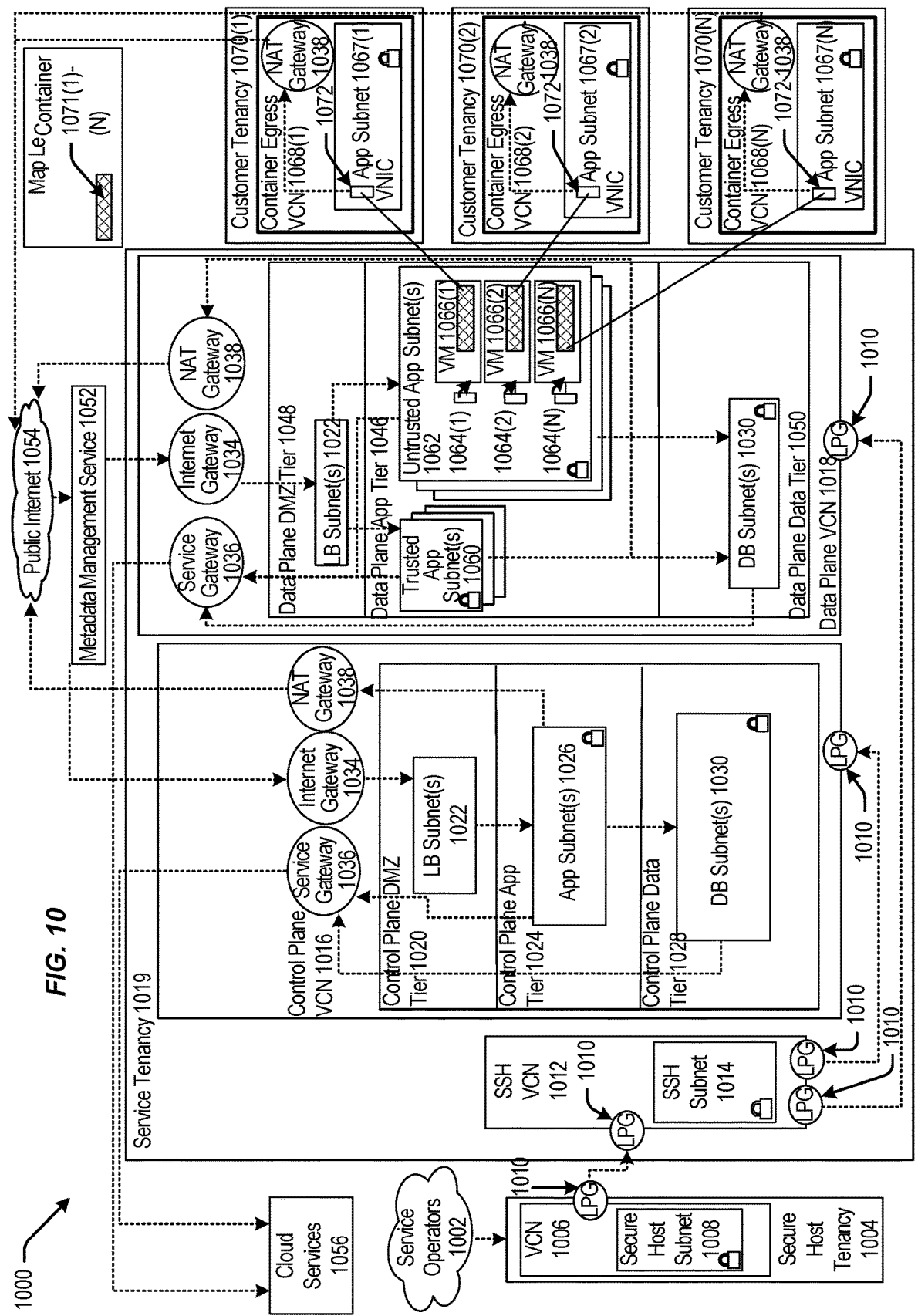
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 802 of FIG. 8) can be communicatively coupled to a secure host tenancy 1004 (e.g. the secure host tenancy 804 of FIG. 8) that can include a virtual cloud network (VCN) 1006 (e.g. the VCN 806 of FIG. 8) and a secure host subnet 1008 (e.g. the secure host subnet 808 of FIG. 8). The VCN 1006 can include an LPG 1010 (e.g. the LPG 810 of FIG. 8) that can be communicatively coupled to an SSH VCN 1012 (e.g. the SSH VCN 812 of FIG. 8) via an LPG 1010 contained in the SSH VCN 1012. The SSH VCN 1012 can include an SSH subnet 1014 (e.g. the SSH subnet 814 of FIG. 8), and the SSH VCN 1012 can be communicatively coupled to a control plane VCN 1016 (e.g. the control plane VCN 816 of FIG. 8) via an LPG 1010 contained in the control plane VCN 1016 and to a data plane VCN 1018 (e.g. the data plane 818 of FIG. 8) via an LPG 1010 contained in the data plane VCN 1018. The control plane VCN 1016 and the data plane VCN 1018 can be contained in a service tenancy 1019 (e.g. the service tenancy 819 of FIG. 8).

The control plane VCN 1016 can include a control plane DMZ tier 1020 (e.g. the control plane DMZ tier 820 of FIG. 8) that can include load balancer (LB) subnet(s) 1022 (e.g. LB subnet(s) 822 of FIG. 8), a control plane app tier 1024 (e.g. the control plane app tier 824 of FIG. 8) that can include app subnet(s) 1026 (e.g. similar to app subnet(s) 826 of FIG. 8), a control plane data tier 1028 (e.g. the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 8) and a network address translation (NAT) gateway 1038 (e.g. the NAT gateway 838 of FIG. 8). The control plane VCN 1016 can include the service gateway 1036 and the NAT gateway 1038.

The data plane VCN 1018 can include a data plane app tier 1046 (e.g. the data plane app tier 846 of FIG. 8), a data plane DMZ tier 1048 (e.g. the data plane DMZ tier 848 of FIG. 8), and a data plane data tier 1050 (e.g. the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g. public Internet 854 of FIG. 8).

The Internet gateway 1034 contained in the control plane VCN 1016 and contained in the data plane VCN 1018 can be communicatively coupled to a metadata management service 1052 (e.g. the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
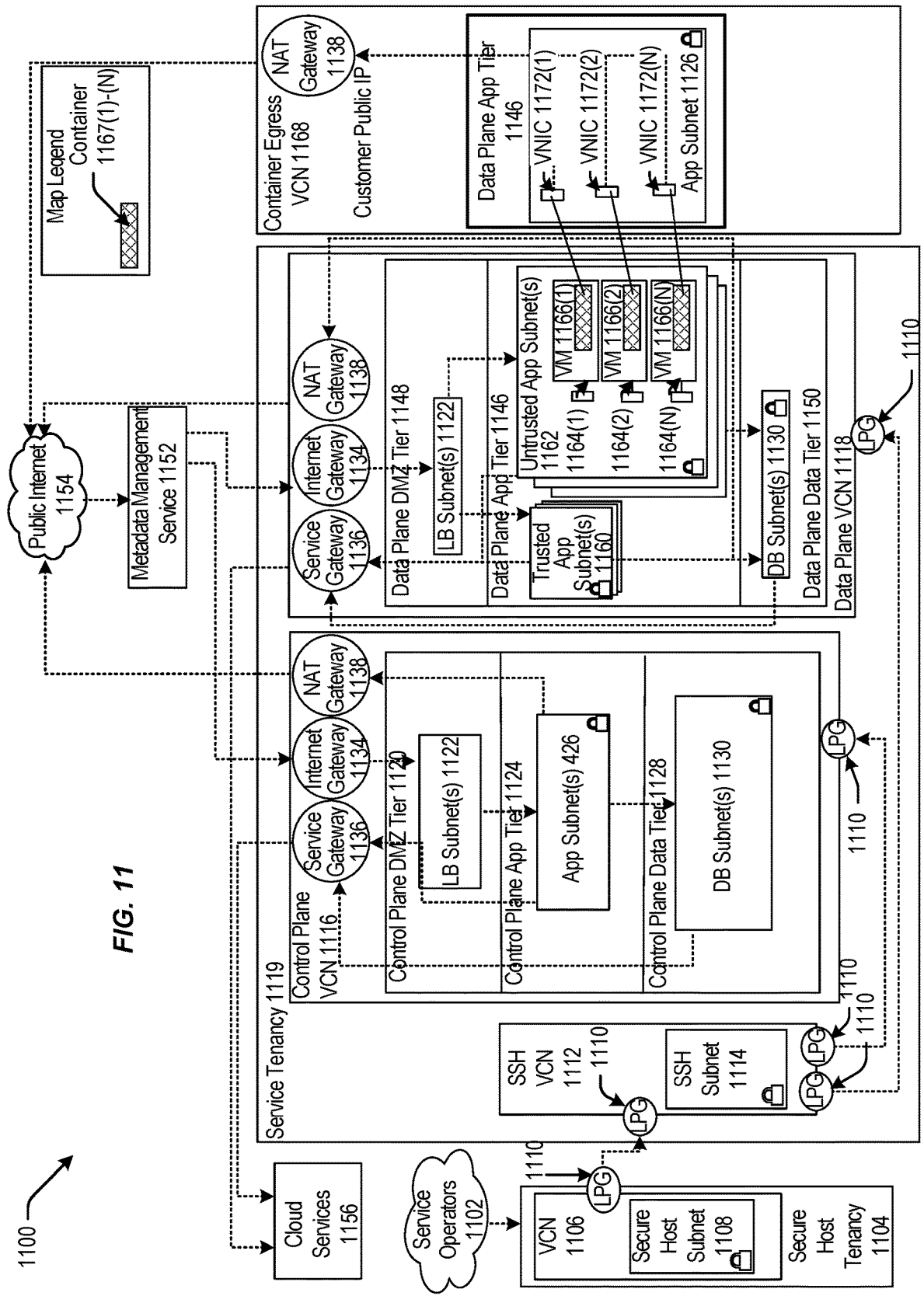
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g. service operators 802 of FIG. 8) can be communicatively coupled to a secure host tenancy 1104 (e.g. the secure host tenancy 804 of FIG. 8) that can include a virtual cloud network (VCN) 1106 (e.g. the VCN 806 of FIG. 8) and a secure host subnet 1108 (e.g. the secure host subnet 808 of FIG. 8). The VCN 1106 can include an LPG 1110 (e.g. the LPG 810 of FIG. 8) that can be communicatively coupled to an SSH VCN 1112 (e.g. the SSH VCN 812 of FIG. 8) via an LPG 1110 contained in the SSH VCN 1112. The SSH VCN 1112 can include an SSH subnet 1114 (e.g. the SSH subnet 814 of FIG. 8), and the SSH VCN 1112 can be communicatively coupled to a control plane VCN 1116 (e.g. the control plane VCN 816 of FIG. 8) via an LPG 1110 contained in the control plane VCN 1116 and to a data plane VCN 1118 (e.g. the data plane 818 of FIG. 8) via an LPG 1110 contained in the data plane VCN 1118. The control plane VCN 1116 and the data plane VCN 1118 can be contained in a service tenancy 1119 (e.g. the service tenancy 819 of FIG. 8).

The control plane VCN 1116 can include a control plane DMZ tier 1120 (e.g. the control plane DMZ tier 820 of FIG. 8) that can include LB subnet(s) 1122 (e.g. LB subnet(s) 822 of FIG. 8), a control plane app tier 1124 (e.g. the control plane app tier 824 of FIG. 8) that can include app subnet(s) 1126 (e.g. app subnet(s) 826 of FIG. 8), a control plane data tier 1128 (e.g. the control plane data tier 828 of FIG. 8) that can include DB subnet(s) 1130 (e.g. DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g. the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g. the service gateway of FIG. 8) and a network address translation (NAT) gateway 1138 (e.g. the NAT gateway 838 of FIG. 8). The control plane VCN 1116 can include the service gateway 1136 and the NAT gateway 1138.

The data plane VCN 1118 can include a data plane app tier 1146 (e.g. the data plane app tier 846 of FIG. 8), a data plane DMZ tier 1148 (e.g. the data plane DMZ tier 848 of FIG. 8), and a data plane data tier 1150 (e.g. the data plane data tier 850 of FIG. 8). The data plane DMZ tier 1148 can include LB subnet(s) 1122 that can be communicatively coupled to trusted app subnet(s) 1160 (e.g. trusted app subnet(s) 1060 of FIG. 10) and untrusted app subnet(s) 1162 (e.g. untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g. public Internet 854 of FIG. 8).

The Internet gateway 1134 contained in the control plane VCN 1116 and contained in the data plane VCN 1118 can be communicatively coupled to a metadata management service 1152 (e.g. the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
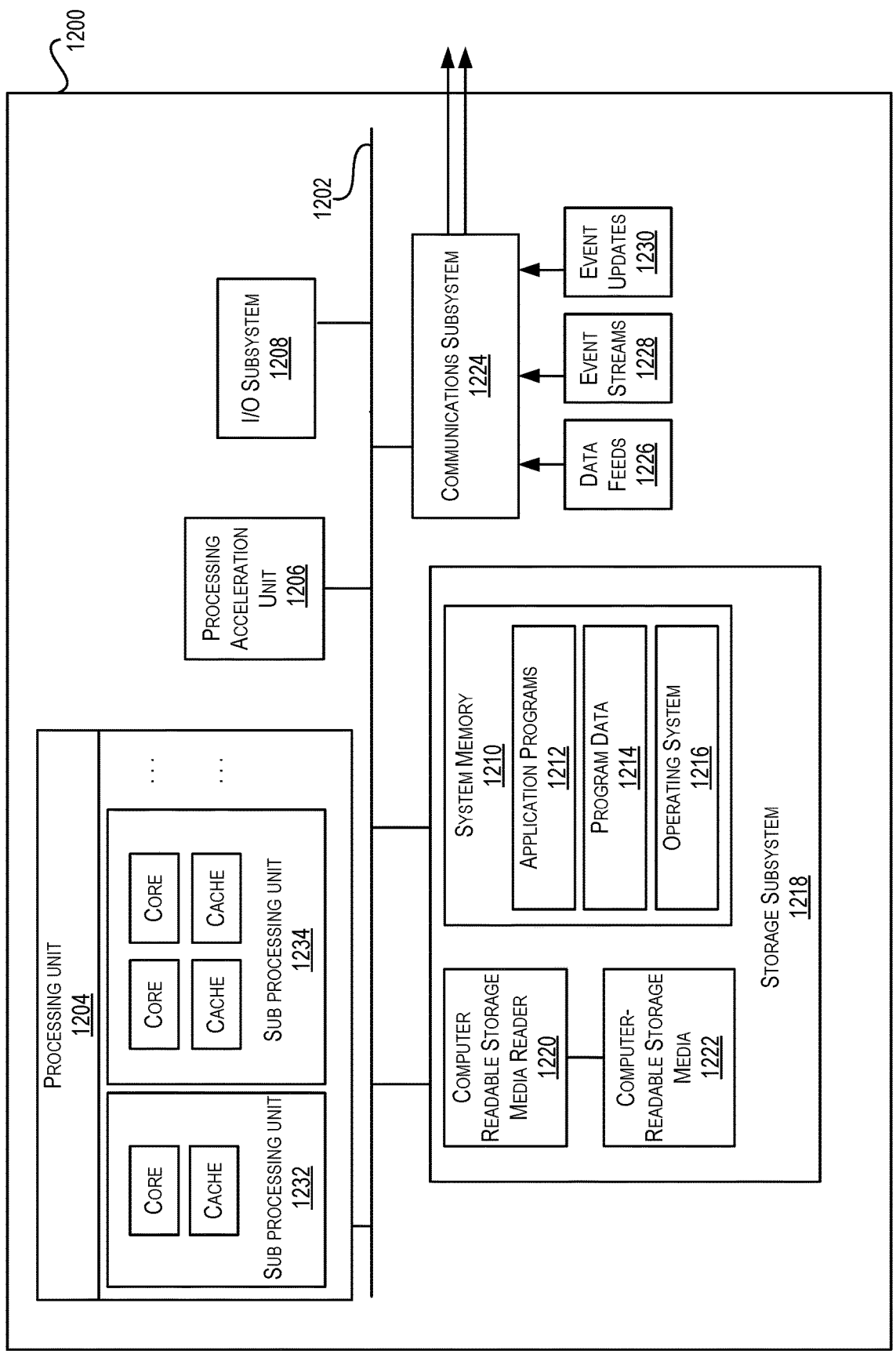
FIG. 12 is a block diagram illustrating an example computer system, according to at least one embodiment.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processing unit 1204 and/or in storage subsystem 1218. Through suitable programming, processing unit 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present disclosure.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    managing, by a computing system, a compute instance of a cloud computing environment based at least in part on management of a first state object corresponding to the compute instance, the first state object comprising a first set of attributes indicating a current state of the compute instance;
    receiving, by the computing system from a requesting computing component, change request data indicating a requested change to a particular attribute of the compute instance;
    deriving, by the computing system, a second state object of the compute instance based at least in part on the requested change and the first state object indicating the current state of the compute instance;
    calculating, by the computing system, a first hash value based at least in part on a first subset of attributes of a second set of attributes of the second state object, the first subset of attributes of the second set of attributes of the second state object being identified based at least in part on a mapping between the requesting computing component and one or more attribute identifiers;
    providing, by the computing system to the requesting computing component, the first hash value;
    executing, by the computing system, the requested change to the compute instance;
    updating, by the computing system, the first state object based at least in part on executing the requested change to the compute instance;
    calculating, by the computing system, a second hash value based at least in part on a second subset of the first set of attributes of the first state object, the second subset of the first set of attributes of the first state object being identified based at least in part on the mapping; and
    providing, by the computing system to the requesting computing component, the second hash value, the requesting computing component being configured to compare the first hash value and the second hash value to verify that the requested change has been implemented at the compute instance.

2. The computer-implemented method of claim 1, wherein each attribute of the first set of attributes of the first state object and each attribute of the second set of attributes of the second state object individually comprise an attribute identifier and a value corresponding to the attribute identifier.

3. The computer-implemented method of claim 1, wherein the second state object and the first state object individually comprise a common set of attributes.

4. The computer-implemented method of claim 1, further comprising storing data identifying the requested change in a storage location, wherein a computing process of the computing system subsequently retrieves the data from the storage location and executes operations to implement the requested change to the compute instance.

5. The computer-implemented method of claim 1, further comprising:
    receiving, by the computing system from a different requesting computing component, a second change request indicating a second requested change to one or more attributes of the compute instance;

deriving, by the computing system, a third state object of the compute instance based at least in part on the first state object and the second requested change;

calculating, by the computing system, a third hash value based at least in part on a third subset of attributes of a third set of attributes of the third state object, the third subset of attributes having attributes that differ from the first subset of attributes of the second state object; and providing, by the computing system to the different requesting computing component, the third hash value being configured to be utilized by the different requesting computing component to verify that the second requested change has been implemented at the compute instance.

6. The computer-implemented method of claim 5, further comprising:

executing, by the computing system, the second requested change to the compute instance;

updating, by the computing system, the first state object based at least in part on executing the second requested change to the compute instance;

calculating, by the computing system, a fourth hash value based at least in part on a fourth subset of attributes of the first set of attributes of the first state object, the fourth subset of attributes having attributes that differ from the second subset of the first set of attributes of the first state object; and providing, by the computing system to the different requesting computing component, the fourth hash value, the fourth hash value being configured to be utilized by the different requesting computing component to verify that the second requested change has been implemented at the compute instance.

7. A computing device, comprising;

a processing device communicatively coupled to a computer-readable medium storing non-transitory computer-executable program instructions that, when executed by the processing device, cause the computing device to:

manage a compute instance of a cloud computing environment based at least in part on management of a first state object corresponding to the compute instance, the first state object comprising a first set of attributes indicating a current state of the compute instance;

receive, from a requesting computing component, change request data indicating a requested change to a particular attribute of the compute instance;

derive a second state object of the compute instance based at least in part on the requested change and the first state object indicating the current state of the compute instance;

calculate a first hash value based at least in part on a first subset of attributes of a second set of attributes of the second state object, the first subset of attributes of the second set of attributes of the second state object being identified based at least in part on a mapping between the requesting computing component and one or more attribute identifiers;

provide, to the requesting computing component, the first hash value;

execute the requested change to the compute instance;

update the first state object based at least in part on executing the requested change to the compute instance;

calculate a second hash value based at least in part on a second subset of the first set of attributes of the first state object, the second subset of the first set of attributes of the first state object being identified based at least in part on the mapping; and provide, to the requesting computing component, the second hash value, the requesting computing component being configured to compare the first hash value and the second hash value to verify that the requested change has been implemented at the compute instance.

8. The computing device of claim 7, wherein each attribute of the first set of attributes of the first state object and each attribute of the second set of attributes of the second state object individually comprise an attribute identifier and a value corresponding to the attribute identifier.

9. The computing device of claim 7, wherein the second state object and the first state object individually comprise a common set of attributes.

10. The computing device of claim 7, wherein executing the computer-executable program instructions further causes the computing device to store data identifying the requested change in a storage location, wherein a computing process of the computing device subsequently retrieves the data from the storage location and executes operations to implement the requested change to the compute instance.

11. The computing device of claim 7, wherein executing the computer-executable program instructions further causes the computing device to:

receive, from a different requesting computing component, a second change request indicating a second requested change to one or more attributes of the compute instance;

derive a third state object of the compute instance based at least in part on the first state object and the second requested change;

calculate a third hash value based at least in part on a third subset of attributes of a third set of attributes of the third state object, the third subset of attributes having attributes that differ from the first subset of attributes of the second state object; and provide, to the different requesting computing component, the third hash value being configured to be utilized by the different requesting computing component to verify that the second requested change has been implemented at the compute instance.

12. The computing device of claim 11, wherein executing the computer-executable program instructions further causes the computing device to:

execute the second requested change to the compute instance;

update the first state object based at least in part on executing the second requested change to the compute instance;

calculate a fourth hash value based at least in part on a fourth subset of attributes of the first set of attributes of the first state object, the fourth subset of attributes having attributes that differ from the second subset of the first set of attributes of the first state object; and provide, to the different requesting computing component, the fourth hash value, the fourth hash value being configured to be utilized by the different requesting computing component to verify that the second requested change has been implemented at the compute instance.

13. A non-transitory computer-readable storage medium storing computer-executable program instructions that, when executed by a processing device of a computing device, cause the computing device to perform operations comprising:

> managing a compute instance of a cloud computing environment based at least in part on management of a first state object corresponding to the compute instance, the first state object comprising a first set of attributes indicating a current state of the compute instance;
> receiving, from a requesting computing component, change request data indicating a requested change to a particular attribute of the compute instance;
> deriving a second state object of the compute instance based at least in part on the requested change and the first state object indicating the current state of the compute instance;
> calculating a first hash value based at least in part on a first subset of attributes of a second set of attributes of the second state object, the first subset of attributes of the second set of attributes of the second state object being identified based at least in part on a mapping between the requesting computing component and one or more attribute identifiers;
> providing, to the requesting computing component, the first hash value;
> executing the requested change to the compute instance;
> updating the first state object based at least in part on executing the requested change to the compute instance;
> calculating a second hash value based at least in part on a second subset of the first set of attributes of the first state object, the second subset of the set of attributes of the first set of attributes of the first state object being identified based at least in part on the mapping; and
> providing, to the requesting computing component, the second hash value, the requesting computing component being configured to compare the first hash value and the second hash value to verify that the requested change has been implemented at the compute instance.

14. The non-transitory computer-readable storage medium of claim 13, wherein the first state object and the second state object individually comprise a common set of attributes.

15. The non-transitory computer-readable storage medium of claim 13, wherein the operations further comprise storing data identifying the requested change in a storage location, wherein a computing process of the cloud computing environment subsequently retrieves the data from the storage location and executes operations to implement the requested change to the compute instance.

16. The non-transitory computer-readable storage medium of claim 13, wherein the operations further comprise:

> receiving, from a different requesting computing component, a second change request indicating a second requested change to one or more attributes of the compute instance;
> deriving a third state object of the compute instance based at least in part on the first state object and the second requested change;
> calculating a third hash value based at least in part on a third subset of attributes of the third set of attributes of the third state object, the third subset of attributes having attributes that differ from the first subset of attributes of the second state object; and
> providing, to the different requesting computing component, the third hash value being configured to be utilized by the different requesting computing component to verify that the second requested change has been implemented at the compute instance.

17. The non-transitory computer-readable storage medium of claim 16, wherein the operations further comprise:

> executing the second requested change to the compute instance;
> updating the first state object based at least in part on executing the second requested change to the compute instance;
> calculating a fourth hash value based at least in part on a fourth subset of attributes of the first set of attributes of the first state object, the fourth subset of attributes having attributes that differ from the second subset of first the set of attributes of the first state object; and
> providing, to the different requesting computing component, the fourth hash value, the fourth hash value being configured to be utilized by the different requesting computing component to verify that the second requested change has been implemented at the compute instance.

* * * * *

UNITED STATES PATENT AND TRADEMARK OFFICE
CERTIFICATE OF CORRECTION

| | |
|---|---|
| PATENT NO. | : 11,481,230 B2 |
| APPLICATION NO. | : 17/125802 |
| DATED | : October 25, 2022 |
| INVENTOR(S) | : Lindholm et al. |

It is certified that error appears in the above-identified patent and that said Letters Patent is hereby corrected as shown below:

On the Title Page

Column 2, Item (56) under Other Publications, Line 1, delete "forthe" and insert -- for the --, therefor.

In the Claims

In Column 32, Line 38, in Claim 17, delete "first the" and insert -- the first --, therefor.

Signed and Sealed this
Twentieth Day of June, 2023

Katherine Kelly Vidal
*Director of the United States Patent and Trademark Office*